US012760169B2

(12) United States Patent
Lin et al.

(10) Patent No.: US 12,760,169 B2
(45) Date of Patent: Oct. 13, 2026

(54) MANUFACTURING METHOD OF LOW-SHRINKAGE PHOTOCURABLE MATERIAL

(71) Applicant: Phrozen Tech Co. Ltd., Hsinchu City (TW)

(72) Inventors: Wei-Chun Lin, Hsinchu City (TW); Yi-Jen Wu, Hsinchu City (TW); Chang-Hsien Li, Hsinchu City (TW)

(73) Assignee: Phrozen Tech Co. Ltd., Hsinchu City (TW)

( * ) Notice: Subject to any disclaimer, the term of this patent is extended or adjusted under 35 U.S.C. 154(b) by 188 days.

(21) Appl. No.: 18/791,956

(22) Filed: Aug. 1, 2024

(65) Prior Publication Data

US 2024/0392109 A1 Nov. 28, 2024

Related U.S. Application Data

(62) Division of application No. 17/336,796, filed on Jun. 2, 2021, now abandoned.

(30) Foreign Application Priority Data

Jun. 2, 2020 (TW) ................................ 109118490

(51) Int. Cl.

| | |
|---|---|
| ***C08K 9/04*** | (2006.01) |
| ***C08J 3/205*** | (2006.01) |
| ***C08K 3/04*** | (2006.01) |
| ***C08K 5/09*** | (2006.01) |
| ***C08K 5/101*** | (2006.01) |
| ***C08K 5/20*** | (2006.01) |
| ***C08L 55/02*** | (2006.01) |

(52) U.S. Cl.
CPC ............... *C08K 9/04* (2013.01); *C08J 3/2053* (2013.01); *C08K 3/04* (2013.01); *C08K 5/09* (2013.01); *C08K 5/101* (2013.01); *C08K 5/20* (2013.01); *C08L 55/02* (2013.01)

(58) Field of Classification Search
CPC . C08K 3/04; C08K 9/04; C08K 5/101; C08K 5/20; C08J 3/205; C08J 3/2053; C08J 2355/02; C08L 55/02; C09D 155/02; C09J 155/02
See application file for complete search history.

(56) References Cited

U.S. PATENT DOCUMENTS

| | | | | |
|---|---|---|---|---|
| 4,243,577 | A * | 1/1981 | Chiao ........................ | C08L 9/02 524/526 |
| 4,537,805 | A | 8/1985 | Lin | |
| 2005/0063892 | A1 | 3/2005 | Tandon et al. | |
| 2009/0085013 | A1 | 4/2009 | Asai | |
| 2011/0293891 | A1 * | 12/2011 | Leyden .................. | B33Y 10/00 522/170 |

* cited by examiner

*Primary Examiner* — Kregg T Brooks
(74) *Attorney, Agent, or Firm* — MUNCY, GEISSLER, OLDS & LOWE, P.C.

(57) ABSTRACT

A low-shrinkage photocurable material is provided in the present disclosure. The low-shrinkage photocurable material includes an acrylonitrile butadiene styrene resin, a carbon black and a dispersant. The carbon black and the dispersant are mixed with the acrylonitrile butadiene styrene resin. The weight percentage of the acrylonitrile butadiene styrene resin is 85%-99.45%, the weight percentage of the carbon black is 0.05%-5%, and the weight percentage of the dispersant is 0.5%-10%.

7 Claims, 7 Drawing Sheets

MANUFACTURING METHOD OF LOW-SHRINKAGE PHOTOCURABLE MATERIAL

RELATED APPLICATIONS

This application is a Divisional Application of the U.S. application Ser. No. 17/336,796, filed Jun. 2, 2021, which claims priority to Taiwan Application Serial Number 109118490, filed Jun. 2, 2020, which is herein incorporated by reference.

BACKGROUND

Technical Field

The present disclosure relates to a 3D-printed material. More particularly, the present disclosure relates to a photocurable 3D-printed material which can reduce the shrinkage of the product after post-curing.

Description of Related Art 3D printing, as the name suggests, is a technique for printing three-dimensional objects. Basically, computers are used to divide a three-dimensional virtual model into a multiple-layered structure, and the 3D printer can laminate the printing material according to the multiple-layered structure and create a physical three-dimensional model. There are three major techniques of 3D printing, which are fused deposition modeling, stereolithography and selective laser sintering. Among of them, stereolithography has higher accuracy and is suitable for manufacturing more complex models. Therefore, stereolithography is widely adopted by industries which need high accuracy for models, such as industrial design, product design, biomedicine and jewelry industries.

Stereolithography is based on the principle of photosensitive materials can be polymerized into solids after being exposed to light. During stereolithography 3D printing, light shines on the photosensitive materials according to one of the layered structures, which are divided from the three-dimensional virtual model. Polymerization occurs in the exposed photosensitive materials, and the exposed photosensitive materials will be cured into a structural layer. After finishing one structural layer, the platform which supports the three-dimensional model will vertically move a distance of the height of the structural layer. A new structural layer is formed by exposure again after the photosensitive materials cover the surface of the aforementioned structural layer, and the new structural layer will firmly bond to the former structural layer. In this regard, the physical three-dimensional model will be formed.

Because the physical three-dimensional model is not fully cured after printed, a post-curing process should be performed to increase the degree of curing of the photosensitive materials in the physical model, so as to obtain a product with more stable structure. However, the materials with higher degree of curing will become brittle and easily broken because of over exposure after the post-curing process, and the overall ductility and malleability of the product will be decreased. Further, the volume of the photosensitive materials may obviously change in the post-curing process, making the product shrink and deform.

In this regard, it is still an unsolved problem to enhance the ductility and malleability of the physical three-dimensional model after post curing and reduce the shrinkage thereof.

SUMMARY

According to an aspect of the present disclosure, a low-shrinkage photocurable material includes an acrylonitrile butadiene styrene resin, a carbon black and a dispersant. The carbon black and the dispersant are mixed with the acrylonitrile butadiene styrene resin. The weight percentage of the acrylonitrile butadiene styrene resin is 85%-99.45%, the weight percentage of the carbon black is 0.05%-5%, and the weight percentage of the dispersant is 0.5%-10%.

According to another aspect of the present disclosure, a manufacturing method of a low-shrinkage photocurable material includes steps as follows. An acrylonitrile butadiene styrene resin is provided, a carbon black solution is provided and a mixing step is performed. The carbon black solution includes a carbon black, a dispersant and a solvent. In the mixing step, the acrylonitrile butadiene styrene resin and the carbon black solution are mixed, to obtain the low-shrinkage photocurable material. The weight percentage of the acrylonitrile butadiene styrene resin is 85%-99.45%, the weight percentage of the carbon black is 0.05%-5%, and the weight percentage of the dispersant is 0.5%-10%.

BRIEF DESCRIPTION OF THE DRAWINGS

The present disclosure can be more fully understood by reading the following detailed description of the embodiment, with reference made to the accompanying drawings as follows.

DETAILED DESCRIPTION

According to an aspect of the present disclosure, a low-shrinkage photocurable material includes an acrylonitrile butadiene styrene (ABS) resin, a carbon black and a dispersant. The carbon black and the dispersant are mixed with the acrylonitrile butadiene styrene resin. The weight percentage of the acrylonitrile butadiene styrene resin is 85%-99.45%, the weight percentage of the carbon black is 0.05%-5%, and the weight percentage of the dispersant is 0.5%-10%.

The carbon black can be a surface-modified carbon black material. For example, the carbon black can be a carbon black with sulfur, a desulfurized carbon black or other modified carbon blacks. The dispersant can be a mixture based on methyl methacrylate (MMA) or a derivative thereof, such as ethyl methacrylate (EMA), butyl methacrylate (BMA), 2-ethylhexyl methacrylate (2-EHMA) or a compound based on methyl methacrylate and including specific functional groups. Also, the dispersant can be dimethylacetamide (DMAC) or a mixture with dimethylacetamide.

The aforementioned low-shrinkage photocurable material can be used to manufacture a physical three-dimensional model. The physical three-dimensional model can be post-cured to form a product. The shrinkage of the physical three-dimensional model in the post-curing process can be reduced because the photocurable material includes the carbon black, which makes the size of the product closer to the original design. Furthermore, the carbon black also helps to improve the properties such as tensile strength, ductility, malleability, thermal resistance and toughness of the product. On the other hand, the dispersion of the carbon black in the photocurable material can be enhanced by adding the dispersant, and the shrinkage of the product can be reduced more significantly.

Figure 1:
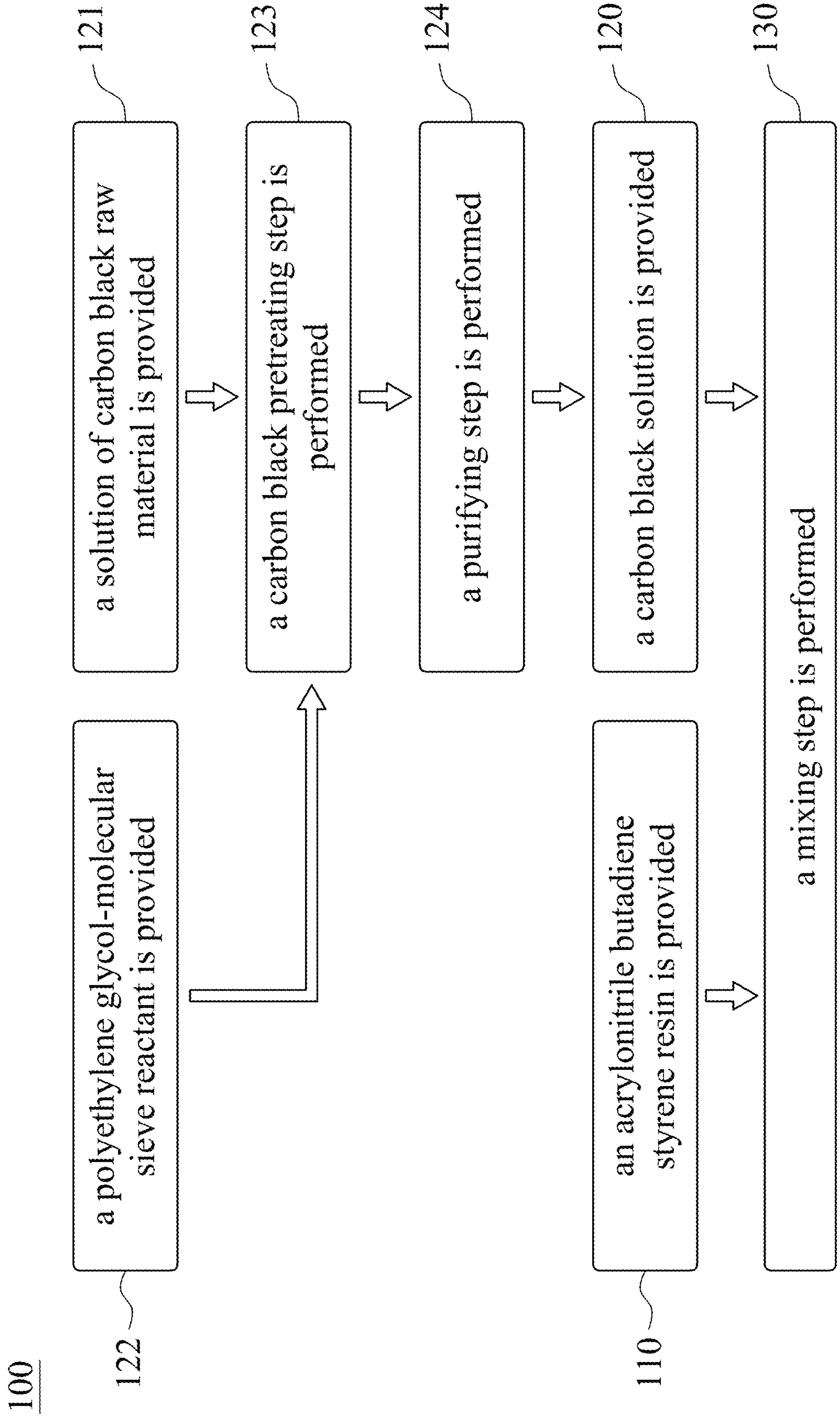
FIG. 1 is a flow chart of a manufacturing method of a low-shrinkage photocurable material according to an aspect of the present disclosure.

Please refer to FIG. 1. FIG. 1 is a flow chart of a manufacturing method of the low-shrinkage photocurable material 100 according to an aspect of the present disclosure. The manufacturing method of the low-shrinkage photocurable material 100 includes Step 110, Step 120 and Step 130.

In Step 110, an acrylonitrile butadiene styrene resin is provided. In Step 120, a carbon black solution is provided, and the carbon black solution includes a carbon black, a dispersant and a solvent. In Step 130, a mixing step is performed to mix the acrylonitrile butadiene styrene resin and the carbon black solution, so as to obtain the low-shrinkage photocurable material. The types and ratios of the ingredients are the same as those in the aforementioned paragraphs, and the details will not be given herein.

The manufacturing method of the low-shrinkage photocurable material 100 can further include Step 121, Step 122, Step 123 and Step 124, to prepare the carbon black used in Step 120 from a carbon black raw material.

In detail, in Step 121, a solution of carbon black raw material is provided. The solution of carbon black raw material is prepared by mixing the carbon black raw material, 2,4-diisocyanato-1-methyl-benzene (TDI), dibutyltin dilaurate (DBTDL) and dimethylformamide (DMF). In Step 122, a polyethylene glycol-molecular sieve reactant is and provided by keeping polyethylene glycol (PEG) and dimethylformamide in a molecular sieve. For example, polyethylene glycol and dimethylformamide can be dehydrated in an environment of low pressure and kept in a 4 Å molecular sieve, to obtain the polyethylene glycol-molecular sieve reactant.

In Step 123, a carbon black pretreating step is performed by mixing and stirring the solution of carbon black raw material, the polyethylene glycol-molecular sieve reactant and dimethylol propionic acid (DMPA), so as to obtain a substance for purification. The weight ratio of the carbon black raw material, 2,4-diisocyanato-1-methyl-benzene, polyethylene glycol and dimethylol propionic acid can be 1:10:17:0.6 to 1:28:50:2. In this step, 2,4-diisocyanato-1-methyl-benzene, polyethylene glycol and dimethylol propionic acid can react and form a prepolymer of polyurethane (PU), and the prepolymer of polyurethane can further cover the carbon black raw material.

In the carbon black pretreating step, the solution of carbon black raw material and the polyethylene glycol-molecular sieve reactant can be first mixed and stirred for a first reaction time, and then dimethylol propionic acid can be added and stirred for a second reaction time. The first reaction time and the second reaction time both can be 1 hour to 3 hours.

In Step 124, a purifying step is performed to purify the substance for purification obtained from the carbon black pretreating step, so as to obtain the carbon black. In the purifying step, the substance for purification can be centrifuged to obtain the first precipitate. The first precipitate is mixed with 40 ml of deionized water and intensely stirred with a frequency of 6000 rpm under room temperature for 15 minutes, so as to obtain a supernatant. The supernatant is centrifuged to obtain a second precipitate. The second precipitate is washed with acetone and deionized water several times and then vacuum-dried under 100° C. for 24 hours to obtain the carbon black.

In the following paragraphs, samples respectively made of "low-shrinkage photocurable material of present disclosure", "acrylonitrile butadiene styrene resin" and "acrylonitrile butadiene styrene resin and carbon black with sulfur" are tested, and the material properties thereof are compared. First, samples of different manufacturing conditions are numbered as Table 1 below.

TABLE 1

Manufacturing Conditions of Samples

| Sample No. | Weight Percentage of Dispersant (MMA) (%) | Weight Percentage of Carbon Black (%) | Post-Curing Time (hr.) |
|---|---|---|---|
| Material: Acrylonitrile Butadiene Styrene Resin | | | |
| Comparison 1 | 0 | 0 | 0 |
| Comparison 2 | 0 | 0 | 1 |
| Comparison 3 | 0 | 0 | 2 |
| Material: Acrylonitrile Butadiene Styrene Resin and Carbon Black with Sulfur | | | |
| Comparison 4 | 0 | 0.1 | 1 |
| Comparison 5 | 0 | 0.1 | 2 |
| Material: Low-Shrinkage Photocurable Material of Present Disclosure (Carbon Black with Sulfur) | | | |
| Example 1 | 1.5 | 0.1 | 0 |
| Example 2 | 1.5 | 0.1 | 1 |
| Example 3 | 1.5 | 0.1 | 2 |
| Material: Low-Shrinkage Photocurable Material of Present Disclosure (Desulfurized Carbon Black) | | | |
| Example 4 | 1.5 | 0.1 | 0 |
| Example 5 | 1.5 | 0.1 | 1 |
| Example 6 | 1.5 | 0.1 | 2 |
| Material: Low-Shrinkage Photocurable Material of Present Disclosure (Modified Carbon Black) | | | |
| Example 7 | 1.5 | 0.1 | 0 |
| Example 8 | 1.5 | 0.1 | 1 |
| Example 9 | 1.5 | 0.1 | 2 |

1. Test 1: Tensile Test

Figure 2:
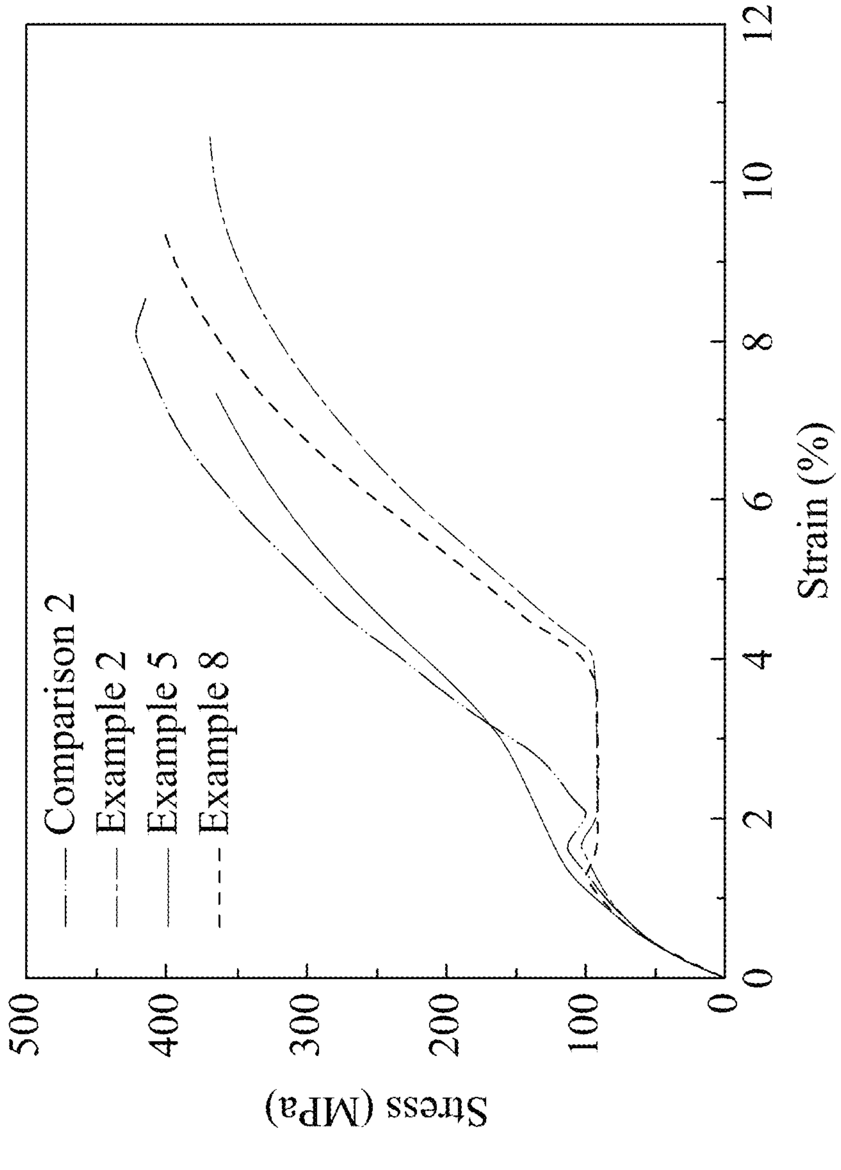
FIG. 2 is a stress-strain curve diagram of Test 1.

In Test 1, the tensile properties of samples made of "acrylonitrile butadiene styrene resin" and "low-shrinkage photocurable material of present disclosure" are compared with each other. Comparison 2, Example 2, Example 5 and Example 8 are tested herein, and the test result is shown in FIG. 2. FIG. 2 is a stress-strain curve diagram of Test 1. The test result shows that every sample reaches its yield point when the stress is around 100 MPa. Before reaching the yield points, the deformations of pulling the samples are elastic. Short, horizontal parts appear in the stress-strain curves after reaching the yield points, where the stress does not change along with the strain and the samples undergo permanent deformation. As compared with Comparison 2, Example 2 and Example 8 have longer horizontal parts after reaching the yield points. In this regard, the samples made of the low-shrinkage photocurable material of the present disclosure have higher yield point elongation, which means the low-shrinkage photocurable material of the present disclosure will generate higher strain by applying smaller stress thereto and is favorable for industrial processing.

2. Test 2: Shrinkage Test

Figure 3:
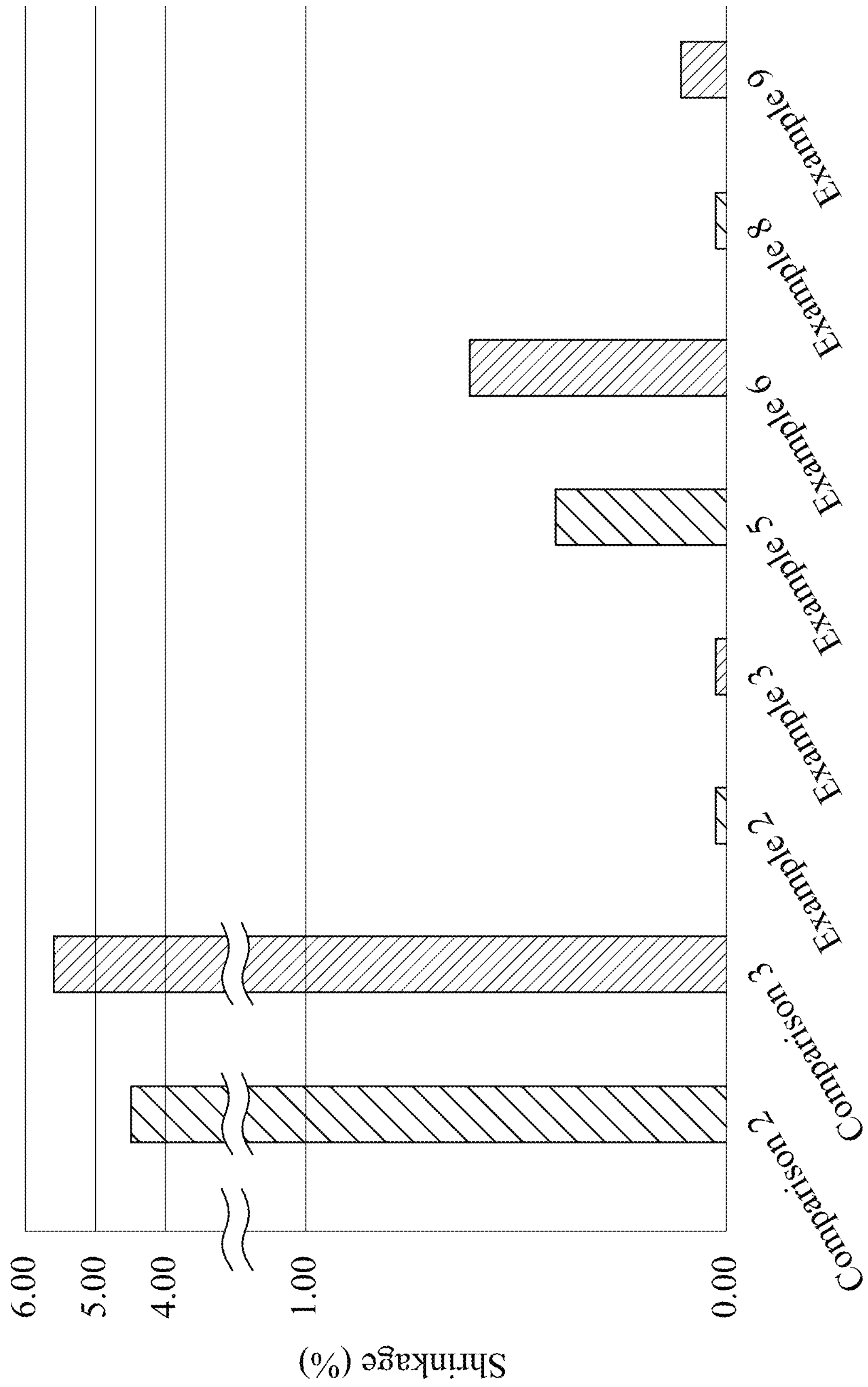
FIG. 3 is a comparison diagram of shrinkage of Test 2.

In Test 2, shrinkages of samples made of "acrylonitrile butadiene styrene resin" and "low-shrinkage photocurable material of present disclosure" are compared with each other. Comparison 2, Comparison 3, Example 2, Example 3, Example 5, Example 6, Example 8 and Example 9 are tested herein, and the test result is shown in FIG. 3 and Table 2 below. FIG. 3 is a comparison diagram of shrinkage of Test 2. The test result shows that the shrinkages of Comparison 2 and Comparison 3 are around 5% and are increased as the post-curing time increased. In comparison, the shrinkages of the aforementioned examples are less than 1%. The results prove that by adding the carbon black and the dispersant into the low-shrinkage photocurable material of the present disclosure, the shrinkages of the samples due to the post-curing process can be effectively reduced. Moreover, the shrinkages of Example 2 and Example 3 are less than other examples, which means the shrinkage problems are improved with the sulfur elements in the carbon black.

TABLE 2

Shrinkages of Samples

| Sample No. | Shrinkage (%) |
|---|---|
| Comparison 2 | 4.50 |
| Comparison 3 | 5.60 |
| Example 2 | 0.02 |
| Example 3 | 0.02 |
| Example 5 | 0.40 |
| Example 6 | 0.60 |
| Example 8 | 0.02 |
| Example 9 | 0.10 |

Figure 4:
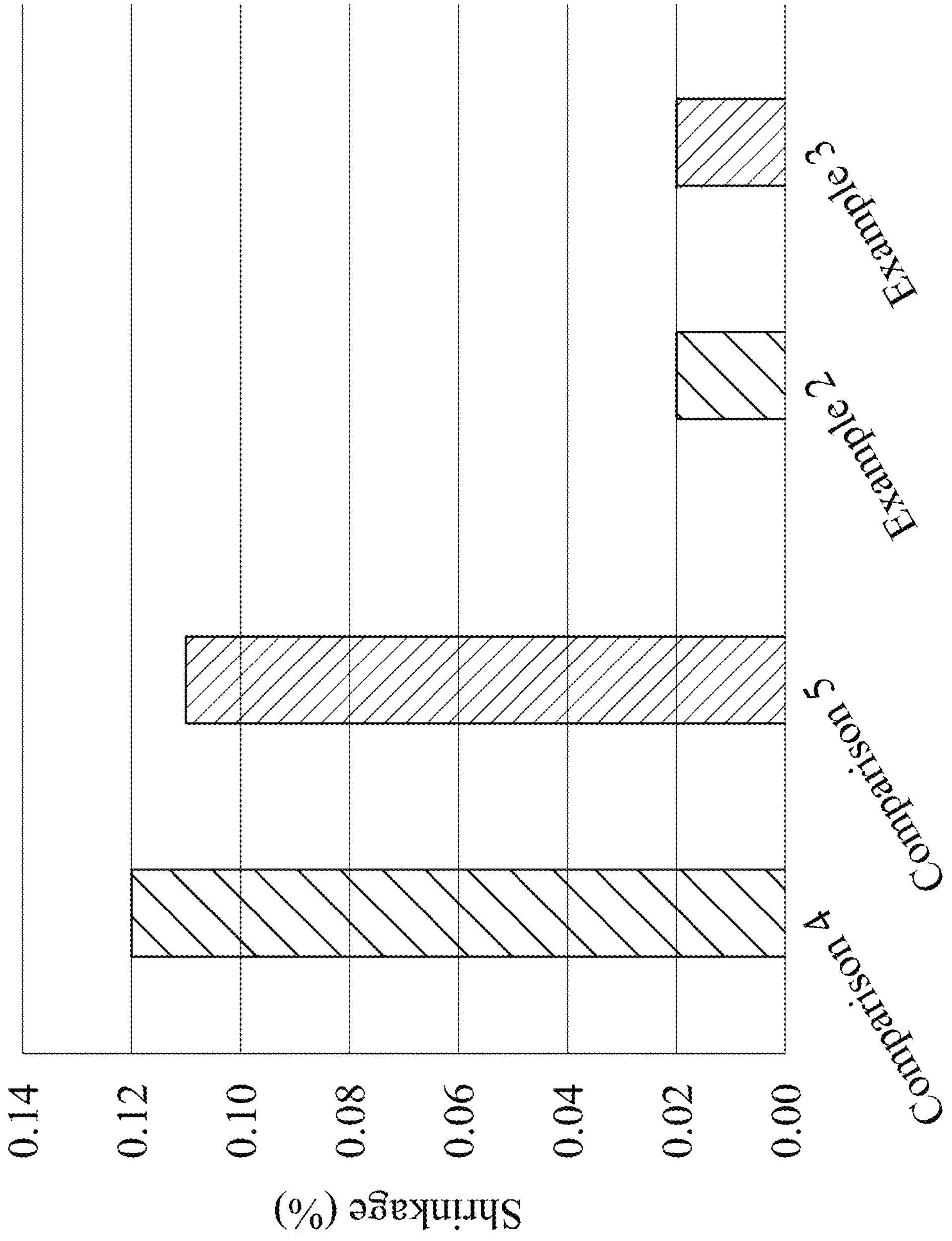
FIG. 4 is another comparison diagram of shrinkage of Test 2.

Furthermore, in this test, shrinkages of samples made of "acrylonitrile butadiene styrene resin and carbon black with sulfur" and "low-shrinkage photocurable material of present disclosure" are also compared with each other. Shrinkages of Comparison 4, Comparison 5, Example 2 and Example 3 are measured and the test result is shown in FIG. 4. FIG. 4 is another comparison diagram of shrinkage of Test 2. The test result shows that the shrinkages of Comparison 4 and Comparison 5 are 0.12% and 0.11%, respectively. The shrinkages of Example 2 and Example 3 are merely 0.02%, which are about 82% less than Comparison 4 and Comparison 5. It proves that by adding the dispersant into the low-shrinkage photocurable material of the present disclosure, the dispersion of the carbon black is improved and the shrinkages of the samples due to the post-curing process are reduced.

3. Test 3: Impact Test

Figure 5:
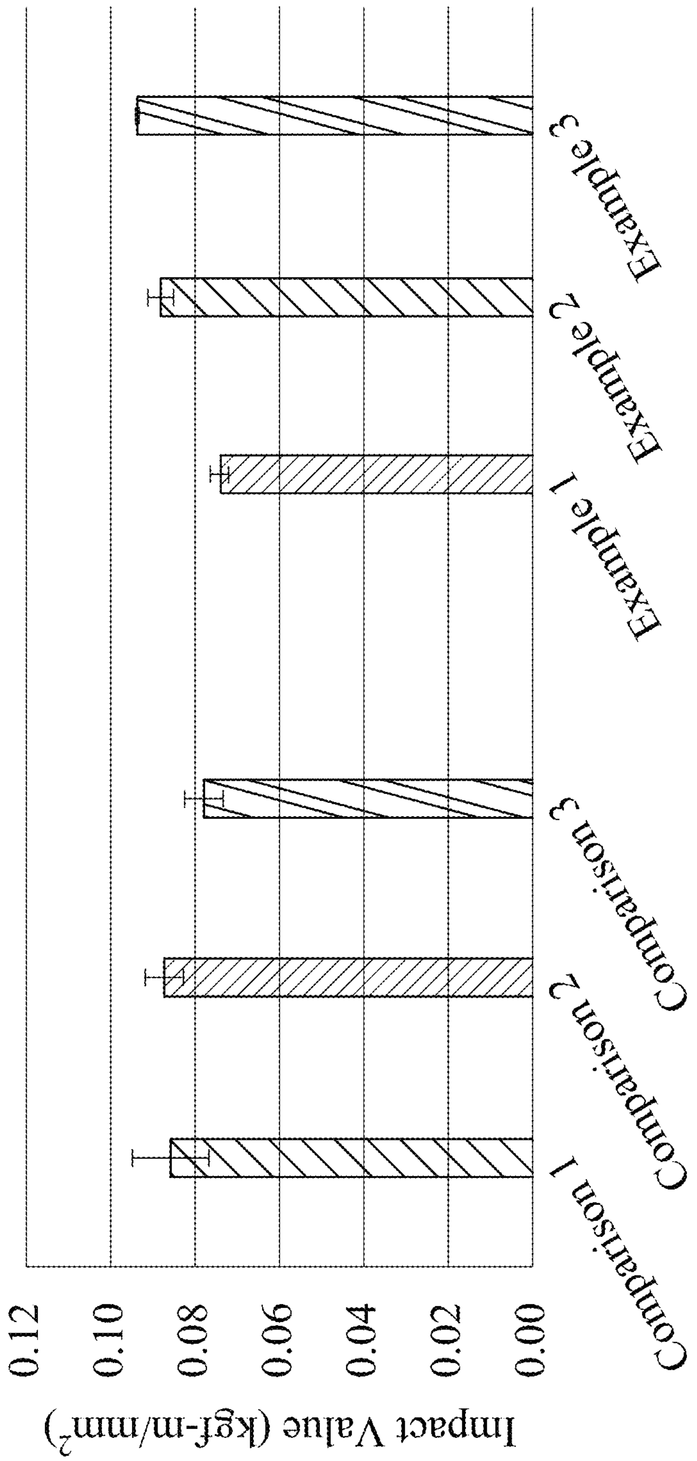
FIG. 5 is a comparison diagram of impact value of Test 3.

In Test 3, toughness of samples made of "acrylonitrile butadiene styrene resin" and "low-shrinkage photocurable material of present disclosure" are compared with each other. Comparison 1 to Comparison 3 and Example 1 to Example 3 are tested herein, and the test result is shown in FIG. 5 and Table 3 below. FIG. 5 is a comparison diagram of impact value of Test 3. The test result shows that the impact value of Example 1 is not greater than Comparison 1 without post-curing. However, the impact values of Example 2 and Example 3 are greater than Comparison 2 and Comparison 3 after the post-curing process. The enhancements of impact values are more significant as the post-curing time increased, and the consistency among the samples is also improved (that is, the standard deviations of impact values decreased). It means that the samples made of the low-shrinkage photocurable material of the present disclosure have better impact-resisting properties and consistency, and is favorable for orthopedics or dentistry as biomedical material with great toughness.

TABLE 3

Impact Values of Samples

| Sample No. | Impact Value (kgf-m/mm$^2$) | Standard Deviation |
|---|---|---|
| Comparison 1 | 0.0855 | 0.020 |
| Comparison 2 | 0.0873 | 0.010 |
| Comparison 3 | 0.0776 | 0.010 |
| Example 1 | 0.0740 | 0.005 |
| Example 2 | 0.0879 | 0.007 |
| Example 3 | 0.0933 | 0.001 |

4. Test 4: Hardness Test

Figure 6:
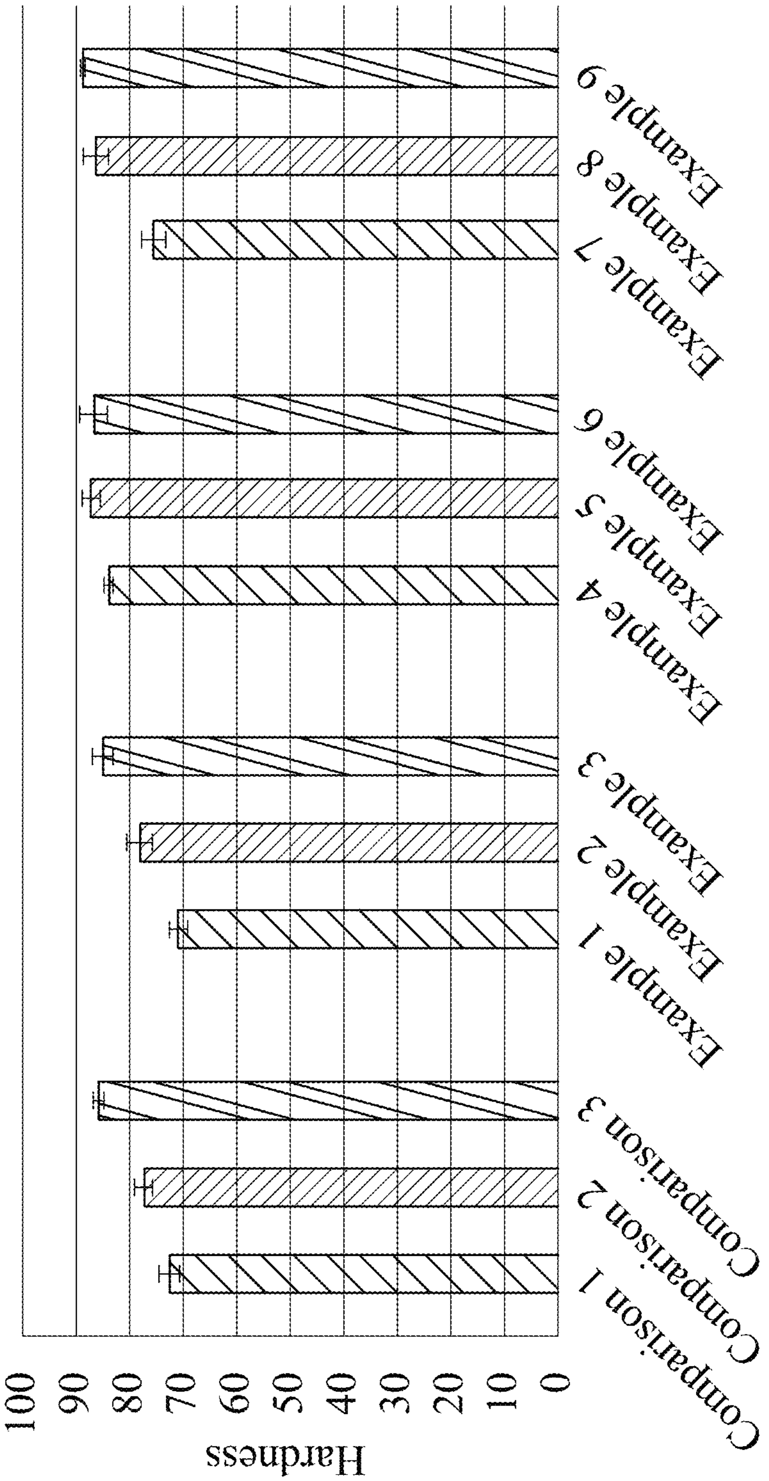
FIG. 6 is a comparison diagram of hardness of Test 4.

In Test 4, the hardness of samples made of "acrylonitrile butadiene styrene resin" and "low-shrinkage photocurable material of present disclosure" are compared with each other. Comparison 1 to Comparison 3 and Example 1 to Example 9 are tested herein, and the test result is shown in FIG. 6 and Table 4 below. FIG. 6 is a comparison diagram of hardness of Test 4. The test result shows that the aforementioned samples have similar hardness, which proves that the samples still remains similar hardness to the acrylonitrile butadiene styrene resin with the addition of the carbon black. It means that the carbon black in the low-shrinkage photocurable material of the present disclosure does not affect the deformation resistance of the samples.

TABLE 4

Hardness of Samples

| Sample No. | Hardness |
|---|---|
| Comparison 1 | 72.2 |
| Comparison 2 | 77.0 |
| Comparison 3 | 85.4 |
| Example 1 | 70.5 |
| Example 2 | 77.8 |
| Example 3 | 84.6 |
| Example 4 | 83.6 |
| Example 5 | 86.8 |
| Example 6 | 86.4 |
| Example 7 | 75.2 |
| Example 8 | 86.0 |
| Example 9 | 88.2 |

5. Test 5: Thermogravimetric Analysis

Figure 7:
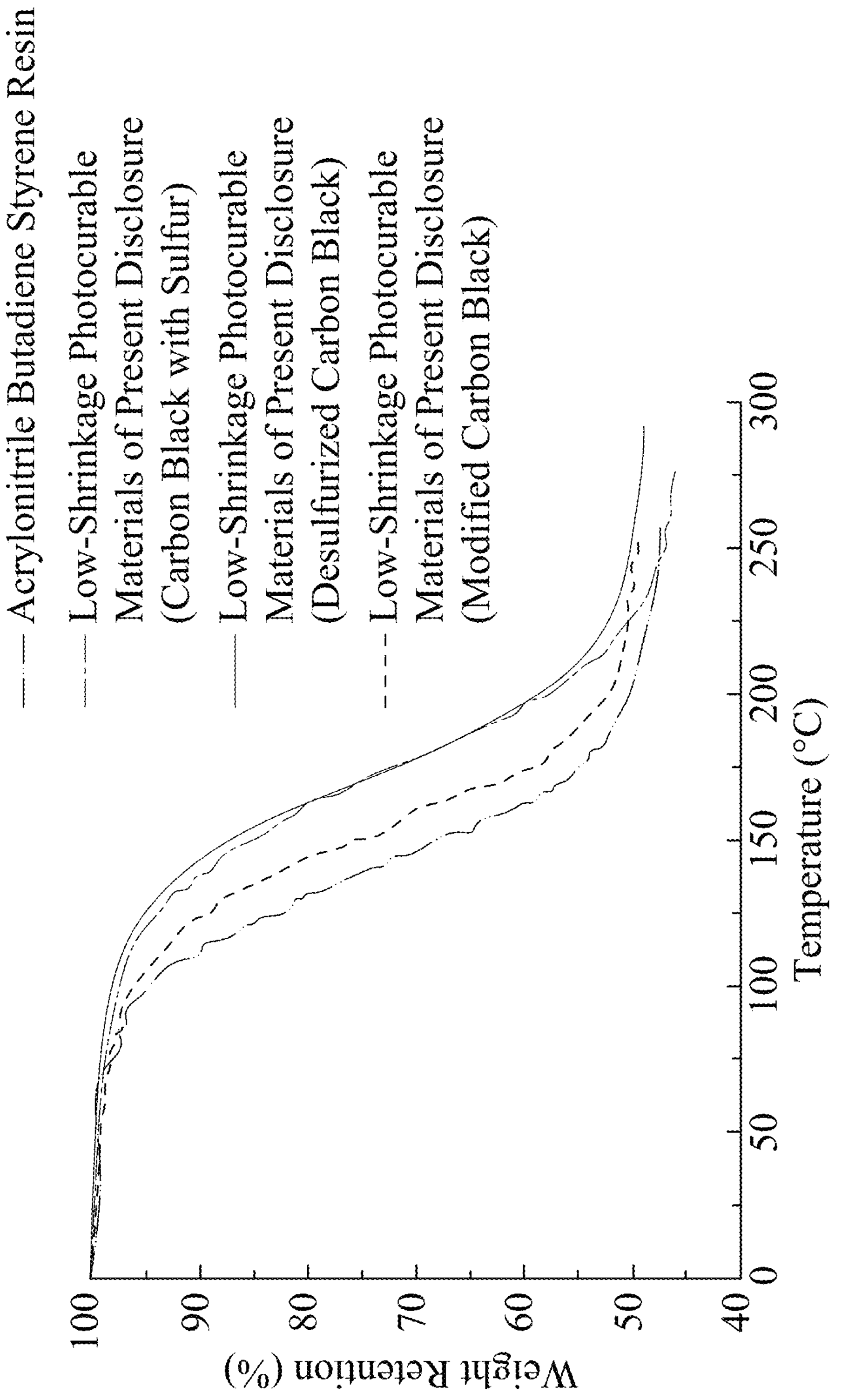
FIG. 7 is a weight loss curve diagram of Test 5.

In Test 5, thermogravimetric analysis on the acrylonitrile butadiene styrene resin and the low-shrinkage photocurable materials of the present disclosure including the carbon black with sulfur, the desulfurized carbon black or the modified carbon black is done. The analysis result is shown in FIG. 7. FIG. 7 is a weight loss curve diagram of Test 5. The analysis result shows that the weights of the aforementioned materials are significantly reduced as heated over 300° C. However, the weight of the acrylonitrile butadiene styrene resin starts to massively lose when the temperature is about 100° C., but the weight retentions of the photocurable materials including the carbon black with sulfur, the desulfurized carbon black or the modified carbon black start to decrease obviously until the temperature reaches 150° C. to 175° C. Thus, the thermal resistances of the low-shrinkage photocurable materials of the present disclosure can be enhanced by adding the carbon black and the dispersant.

In this regard, according to the low-shrinkage photocurable material of the present disclosure, the shrinkage of the product after the post-curing process can be reduced by adding the carbon black. The tensile strength, ductility, malleability, thermal resistance and toughness of the product can also be improved. By adding the dispersant, the dispersion of the carbon black in the photocurable material is enhanced. Therefore, the shrinkage of the product after the post-curing process is reduced and the properties of the product are maintained due to the good distribution of the carbon black.

Although the present disclosure has been described in considerable detail regarding certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. Given the foregoing, it is intended that the present disclosure cover modifications and variations of this disclosure provided they fall within the scope of the following claims.

What is claimed is:

1. A manufacturing method of a low-shrinkage photocurable material, comprising:
- providing an acrylonitrile butadiene styrene resin;
- providing a carbon black solution comprising a carbon black, a dispersant and a solvent; and
- performing a mixing step to mix the acrylonitrile butadiene styrene resin and the carbon black solution, so as to obtain the low-shrinkage photocurable material;
- wherein based on a total weight of the low-shrinkage photocurable material, the weight percentage of the acrylonitrile butadiene styrene resin is 85%-99.45%, the weight percentage of the carbon black is 0.05%-5%, and the weight percentage of the dispersant is 0.5%-10%.

2. The manufacturing method of the low-shrinkage photocurable material of claim 1, wherein the carbon black is a surface-modified carbon black material.

3. The manufacturing method of the low-shrinkage photocurable material of claim 1, wherein the dispersant is a methyl methacrylate, a derivative of methyl methacrylate, a mixture with methyl methacrylate, a dimethylacetamide or a mixture with dimethylacetamide.

4. The manufacturing method of the low-shrinkage photocurable material of claim 1, further comprising:
- providing a solution of carbon black raw material, wherein the solution of carbon black raw material is prepared by mixing a carbon black raw material, a 2,4-diisocyanato-1-methyl-benzene, a dibutyltin dilaurate and a dimethylformamide;
- providing a polyethylene glycol-molecular sieve reactant by keeping a polyethylene glycol and another dimethylformamide in a molecular sieve;
- performing a carbon black pretreating step by mixing and stirring the solution of carbon black raw material, the polyethylene glycol-molecular sieve reactant and a dimethylol propionic acid, so as to obtain a substance for purification; and
- performing a purifying step to purify the substance for purification, so as to obtain the carbon black.

5. The manufacturing method of the low-shrinkage photocurable material of claim 4, wherein a weight ratio of the carbon black raw material, the 2,4-diisocyanato-1-methyl-benzene, the polyethylene glycol and the dimethylol propionic acid is 1:10:17:0.6 to 1:28:50:2.

6. The manufacturing method of the low-shrinkage photocurable material of claim 4, wherein the solution of carbon black raw material and the polyethylene glycol-molecular sieve reactant are first mixed and stirred for a first reaction time, and then the dimethylol propionic acid is added and stirred for a second reaction time in the carbon black pretreating step.

7. The manufacturing method of the low-shrinkage photocurable material of claim 6, wherein the first reaction time and the second reaction time are both 1 hour to 3 hours.

* * * * *